Sept. 18, 1945.  E. B. SCHERL  2,385,107
BLOWPIPE
Filed Sept. 9, 1941
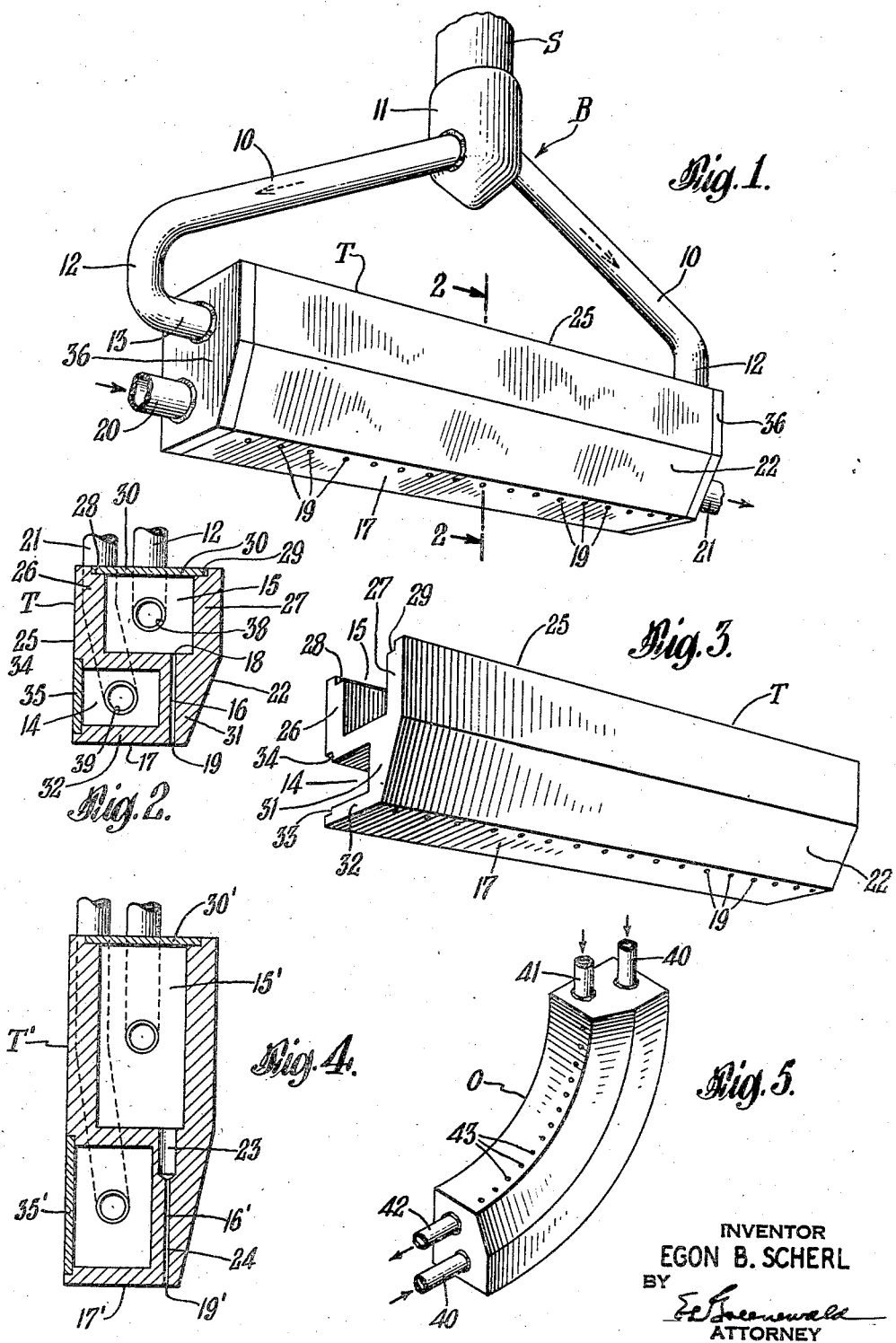
INVENTOR
EGON B. SCHERL
BY
ATTORNEY Patented Sept. 18, 1945

2,385,107

UNITED STATES PATENT OFFICE 2,385,107

BLOWPIPE

Egon B. Scherl, Niagara Falls, N. Y., assignor to The Linde Air Products Company, a corporation of Ohio Application September 9, 1941, Serial No. 410,147

17 Claims. (Cl. 158—27.4)

This invention relates to blowpipes and more particularly to improved apparatus for use as a heating unit for pressure welding or surface treating when supplied with a combustible gas-oxygen mixture or for thermochemically removing or severing ferrous metal when supplied with oxygen alone.

In the design of blowpipe tips or heads, it is desirable to provide for the most effective utilization of the available cross-sectional area in the tip for the coolant and for the gas passages or channels, in order to secure satisfactory cooling under high temperature conditions of operation. In pressure welding blowpipes, a high degree of visibility of the work and of access of secondary air are highly desirable features, and are especially desirable in a blow pipe to be used for the pressure welding of thin sections or, in general, sections requiring the use of clamps, in accordance with known processes of pressure welding.

Among the objects of this invention are, therefore, to provide a welding blowpipe which affords the maximum amount of visibility to the zone under the flames and ample access for the flow of secondary air to the flames for proper combustion of the gas; to provide a blowpipe tip of minimum width and maximum efficiency. Further objects of the invention are to provide a blowpipe of improved flashback resistance; a tip comprising an elongated body or orifice bar which may be readily modified for use with work of any given shape; and an internally cooled tip that is simple and economical in construction.

Another object of the invention is to provide a fluid cooled tip comprising an orifice bar, equipped with a row of apertures, that can be used either as a source of heat for pressure welding or for heat treating or for such types of surface treatment as paint removing descaling, etc., when supplied with oxy-fuel gas, or as a means for surface cutting or ferrous metal removal when supplied with oxygen under pressure.

When used as a source of heat and when supplied at a given rate with coolant and a combustible gas mixture, such as oxygen and acetylene, the apparatus of the present invention provides a high order of visibility of the zone under the flames, ample access of secondary air through normal convection, and a high degree of utilization of the available cross-sectional area for the coolant and the gas passages. Furthermore, the apertures may be spaced at very close intervals and may be of sufficient length to insure freedom from turbulence of the emergent jets but not of such length as to cause difficulties in manufacture.

Additionally, the orifice bar of the invention can be fabricated by extrusion with little subsequent assembly, and is deformable readily into a variety of curved shapes for special uses, consistent with rigidity and heat conduction properties.

Referring to the drawing:

Fig. 1 is a fragmentary perspective view of a blowpipe embodying features of the invention;

Fig. 2 is a view in cross section taken on line 2—2 of Fig. 1;

Fig. 3 is a perspective view of the extruded part forming the main body of the orifice bar or blowpipe head or tip;

Fig. 4 is a view similar to Fig. 2 of a modification; and

Fig. 5 is a fragmentary perspective view of a curved orifice bar according to the invention.

In a known process of pressure welding, the members to be welded are arranged in abutting relation and while pressed together are heated adjacent the line of junction until the material in the vicinity of the joint is deformed outwardly beyond the original surface of the members to be welded. Or, if the members have been bevelled, the material in the bevelled portion at the joint is deformed outwardly until it reaches the level of the original surface. In either case, the purpose of the deformation is to expand the original area of the abutting surfaces while they are in intimate contact and pressed together. It is thus obvious that the manner in which the heat is applied to the joint is a very important consideration from the standpoint of fuel economy, since only that portion of the heat which aids in expanding the interface is of value in contributing to the strength of the bond. In other words, in order to make the best use of the fuel, the heated zone, and thus the zone of deformed metal, should be as narrow as possible, yet sufficiently wide to assure that the center of the thickness at the joint is above the welding temperature at the completion of the welding operation.

For producing pressure welds, it is known that a single row of flames reciprocated across the joints is usually very effective. By choosing the proper orifices and stroke of reciprocation, the heat input to the members to be welded can be so regulated that the desired type of deformation can be readily obtained. When the members to be welded are approximately ¼ inch or less in thickness, it is customary to clamp the abutting members in position at a predetermined distance from either side of the joint. The distance generally chosen is such that the tendency to buckle during plastic deformation is substantially overcome without an inordinate loss of heat to the clamps. In ⅛ inch thick plate, for instance, satisfactory pressure welds have been made when the leading edge of each clamp was ¼ inch away from the joint. The blowpipe or blowpipes are generally kept stationary when welding such relatively thin sections.

Another known example of pressure welding that requires the use of clamps, is in welding curved parts, such as longitudinal seams in pipe. Unless the abutting members are properly restrained, there is a great tendency for the pipe to assume an oval or otherwise distorted cross section. In some cases, the separation of clamps when welding longitudinal seams in 5¾ inch outside diameter pipe of 0.12 inch wall thickness is as much as one inch; for 6⅝ inch outside diameter pipe of 0.28 inch wall thickness, as much as two inches; and for 6⅝ inch pipe of 0.86 inch wall thickness, as much as 2¾ inches. The increase in the allowable separation is probably due to the increase in width of the plastic zone with the increase in wall thickness.

In known forms of blowpipe heads for producing a single row of flames, it is customary to have the passage or opening for the cooling fluid laterally adjacent to, or above or behind the gas distributing chamber. Such construction, however, has many disadvantages that are eliminated by the present invention. For example, when the cooling channel is laterally adjacent to the gas distributing chamber the disadvantages are poor visibility of work, poor access of secondary air when the flames are directed downwardly, and very short efferent or outlet gas passages if the cross section is small. When the cooling channel is above or behind the gas channel, the disadvantages are inefficient cooling because the cooling channel is remote from the efferent gas passages thus increasing flashback tendencies; it is impossible to provide for larger inlet ends of the efferent gas passages, and the disadvantages and difficulties mentioned above where the cooling channel is laterally adjacent to the gas channel, are also present.

It has been found, also, that many shortcomings are possessed by the so-called "heat-treating heads" now in use which, in general, consist of a block of copper or other heat conducting metal or alloy appropriately hollowed out in its interior to form gas passages leading to a plurality of sockets equipped with interchangeable tips and plugs, and other passages for circulating a cooling fluid. Such heat treating heads are, in general, unsuitable for pressure welding due to the fact that the use of tips limits the proximity of the flames to each other. This is a particular disadvantage in the welding of relatively thin members, or members composed of materials of poor heat conductivity wherein sharp temperature gradients are caused to exist from one flame to the next unless the flames are applied quite close together. Also, such heads usually possess a plurality of rows of tips that in general cover a considerably wider zone than is required. Even if some of these rows were made inoperable by plugging the tip sockets, the visibility of the work would be impaired by the unused portions of the head, and the access of secondary air would be restricted.

Referring to Figs. 1, 2 and 3 of the drawing, there is provided in accordance with the invention a blowpipe B comprising a stem S which is supplied with a mixture of combustible gas, such as acetylene, and a combustion-supporting gas, such as oxygen, when the blowpipe B is to be used for heating. Alternatively the stem S may be supplied solely with commercially pure oxygen in case the blowpipe is to be used for scarfing or cutting, for example. A pair of divergent pipes 10, 10 are connected to the outlet end of the stem S through a head 11, the outer end portions of the divergent pipes 10 being turned inwardly at 12 to provide aligned outlets 13 which are connected to the opposite ends of a tip comprising an orifice bar or elongated body T.

The orifice bar T is preferably of substantially rectangular cross section and has parallel, longitudinally extending, juxtaposed coolant and gas channels 14 and 15, respectively, preferably of substantially rectangular cross section, and a plurality of transverse outlet or efferent gas passages 16 extending between gas distributing channel 15 and the face of the orifice bar or tip. The coolant channel 14 and the gas channel 15 are disposed in substantially close relation with each other, the coolant channel 14 being arranged between a flame or gas outlet face 17 of the bar T and the gas channel 15. The coolant channel is beneath and slightly offset laterally with respect to the gas channel and the web of the coolant channel is arranged at an angle with respect to the web of the gas channel. The efferent gas passages 16 are disposed laterally of the coolant channel 14 between an inner lateral surface of the coolant channel and one side of the bar T, in the portion of the bar provided by the slight lateral offsetting of the coolant channel 14 with respect to the gas channel 15, with their inlet ends 18 opening into the gas channel 15 and their outlet ends 19 terminating at the bottom face 17. With the coolant channel being arranged substantially in tandem relative to the gas channel, the overall width of the bar is less than twice the width of either one of the channels 14 and 15.

Thus, gas is supplied to the opposite ends of the gas passage 15 through the pipes 12, while a cooling fluid is supplied to one end of the coolant channel 14 through an inlet pipe 20 and is discharged from the opposite end of the coolant channel 14 through an outlet 21. The channel 14 for the coolant, such as water, is situated between the gas channel 15 and the face 17, and immediately adjacent to the efferent gas passages 16 so that the cooling action is highly efficient, and the form of the cross section is such that it offers little impairment to visibility of the work or to the access of secondary air. Unnecessary thickness of metal adjacent to the efferent gas passages 16 preferably is avoided by bevelling the lateral surface of the bar T at 22, although this feature of the invention may be omitted if desired. It is, however, preferred in cases where, for the sake of sturdiness, the side walls of the bar T are made of such thickness that the external orifices 19 would be spaced an appreciable distance from the edge of the bar.

The relative dimensions of orifice bar T preferably are such that the width of the bar is kept at a minimum, while the necessary volume of oxy-fuel and coolant channels 15 and 14, respectively, is obtained by extending their vertical dimensions so as to increase the depth of the blowpipe tip. The coolant channel 14, however, must never be made so narrow as to permit localized overheating at the existing velocity of the cooling fluid.

When the bar T is of considerable length, and the distance between the coolant inlet and outlet is thus so great that a relatively large volume of coolant must be circulated through the channel 14, the depth of such channel may become of considerable magnitude. Under these circumstances, the great length of the holes 16 to be drilled to provide apertures 19 for the flames may present difficulties from the standpoint of fabrication, especially since a long drill of the small diameter generally required has a tendency to become bowed during the drilling operation and results in holes that do not have parallel sides or whose axes are not rectilinear. Such undesirable condition is avoided in the bar of the present invention by having each efferent gas passage 16', as shown in Fig. 4, consist of an inlet portion 23 of larger diameter and an outlet portion 24 of smaller diameter in coaxially aligned relation. The inlet portion 23 of larger diameter, which may or may not be tapered, extends from the oxy-fuel chamber 15' for part of the distance toward the face 17', and the portion 24 of smaller diameter extends from the portion 23 to the external orifice 19' in the face 17' of the elongated body or bar T'. The length of the smaller hole 24 is preferably sufficient to provide an emergent oxy-fuel jet substantially free from turbulence. The deleterious effects of a sudden change in the direction of the gas flow are obviated both by this change in cross sectional diameter of the passage, as well as by the large ratio of length to diameter.

The orifice bar T preferably consists of an extruded body member 25 having flanges 26 and 27 formed with grooves 28 and 29 in their outer edges for receiving a closure plate 30 that is preferably welded in place after the holes 16 have been formed. The body member 25 is also provided with a flange 31, on the outer end of which is a flange 32 extending substantially perpendicularly to flange 31. The outer end of flange 32 and the inner end of flange 26 are provided with groove 33 and 34 for receiving a closure plate 35 which preferably is welded in place. End plates 36, 36, each having openings 38 and 39, are finally secured to the body member 25 and the plates 30 and 35 in any suitable manner, as by hard soldering or welding, to complete the tip T. The ends 13 of the gas pipes 10 are secured in openings 38, and the ends of the cooling fluid inlet pipe 20 and outlet pipe 21 are secured in openings 39, of the plates 36, preferably by hard soldering or welding.

Although the orifice bars T and T' require closure strips 30 and 35, and 30' and 35', respectively, which are welded in place to seal and complete the coolant and oxy-fuel channels 14 and 15, it will be recognized that in some cases it might be more feasible, where the bodies 25 are prepared by extrusion, to have the walls corresponding to cover members 30 and 35 or 30' and 35' integral with the body 25 of the orifice bar. In the modification shown in Fig. 4, where the efferent gas passages 16' consist of portions 23 and 24 of different diameters, the larger hole 23 may be drilled through the wall of the bar corresponding to the cover 30', and the holes in such wall subsequently closed and sealed.

Curved forms of the orifice bar of the invention have been constructed and used in the pressure welding of longitudinal seams in pipe elbows.

Referring to Fig. 5 there is shown a curved orifice bar O constructed in accordance with the invention. The cross section of the bar O is substantially similar to that shown in Figs. 2 and 4, gas, such as a mixture of oxygen and acetylene, being delivered to the gas chamber through the pipes 40, 40 at opposite ends of the bar and the cooling fluid being delivered to the coolant chamber through a pipe 41 at one end thereof and discharged from the coolant chamber at the other end thereof through the pipe 42. The curvature of the orifice bar O in Fig. 5 is such that the axes of the flames from the ports 43 form radii having a common center. If desired, the orifice bar may be curved so that the axes of the flames are parallel to one another and to a common axis. Various other curved forms of the blowpipe or orifice bar will suggest themselves to those skilled in the art, depending upon the shape of the work to be cut or welded.

Inasmuch as completed pressure welds are generally heat treated with the same or a similar blowpipe tip as used for the welding operation, it follows that the orifice bar of the invention, which has proved to be successful for welding, is likewise suitable for such heat treating uses. Furthermore, by using oxygen instead of oxy-fuel gas, it is possible to use the orifice bar of the invention as a cutting tip to remove upset metal from pressure welds either during or after the welding operation. In this use, the bar is placed on or very close to the welded members, with the orifices directed at the base of the upset and parallel to the original surface of the pressure welded members. The jets of oxygen directed at the base of the upset, previously heated to the ignition point, initiate a combustion reaction that rapidly spreads until essentially the entire upset has been converted into fluid slag and dispersed. If this operation is done during the course of the welding process, the upset is removed as rapidly as it emerges into the path of the oxygen jets. Because, however, the relatively cool metal is constantly being introduced into the weld zone, it becomes preferable to use a preheating orifice bar in conjunction with the cutting orifice bar.

The present invention provides a most efficient use of the cross-sectional area of the bar, and the fact that it can be produced in large length units which in turn may be cut and suitably bevelled for any particular use, is a most desirable feature. The arrangement is such that the gas discharge passages may be arranged at very close intervals and may be of such length as to insure freedom from turbulence in the emergent jets. The bar of the invention may be readily manufactured by extrusion and, as pointed out above, it may be deformed readily to a variety of curved shapes for special use. A further advantage of the apparatus of this invention lies in the effective use thereof in corners and other close quarters, and close to surfaces, such as in desurfacing ferrous metal bodies with oxygen.

That form of the invention shown in Fig. 2 has been successfully operated with dimensions substantially as follows: overall width of the bar T, 5/8 inch; overall depth of the bar T, 3/4 inch; depth of the gas channel 15 (without closure plate 30), 3/8 inch; depth of the coolant channel 14, 1/4 inch; width of the coolant channel (without closure plate 35), 3/8 inch; diameter of the gas discharge passages, No. 70 drill; width of the face 17, 1/2 inch, the other dimensions being proportioned to the scale, substantially as shown in Fig. 2. It will be seen that the overall width of the bar is less than twice the width of either one of the longitudinal channels in the bar.

While specific forms of the invention have been described for purposes of illustration, it will be understood that the invention may be otherwise embodied without departing from the principles thereof.

What is claimed is:

1. A blowpipe tip comprising an extruded orifice bar of substantially constant cross-section from end to end having formed thereon a bottom face, said bar having formed therein a longitudinal coolant channel having a wall comprising a side wall of the bar adjacent said bottom face, a longitudinal gas channel also formed in said bar, and a plurality of efferent gas passages in said side wall, said channels being disposed in substantially close relation with each other, said coolant channel being arranged between the bottom face of the bar and said gas channel and slightly offset laterally with respect to the gas channel to locate the coolant side wall directly beneath the bottom of the gas channel; and said efferent gas passages being disposed between said coolant channel and one side of the bar with their inlet ends opening directly into said gas channel, said coolant channel being thereby in substantially tandem relationship with respect to the gas channel and the overall width of the bar being less than twice the width of either one of the channels.

2. A blowpipe tip as claimed in claim 1, provided with end plates secured to the ends of the metal bar to close the ends of the longitudinal channels and a coolant inlet and a coolant outlet at the opposite ends of said coolant channel and in the respective end plates.

3. A blowpipe tip as claimed in claim 1, provided with end plates secured to the ends of the metal bar to close the ends of the longitudinal channels and a gas inlet at each end of said gas channel and in the respective end plates.

4. A blowpipe tip as claimed in claim 1, provided with end plates secured to the ends of the metal bar to close the ends of the longitudinal channels and a coolant inlet at one end and a coolant outlet at the other end of said coolant channel and in the respective plates, and a gas inlet at each end of said gas channel and in each plate.

5. A blowpipe tip comprising an elongated bar having a cross-section in the form of a double tube with a relatively thin outer shell including a thin wall with an outlet face portion and a relatively thin common internal partition separating coolant and gas channels which extend substantially throughout the length of the bar, the gas channel having a portion slightly laterally offset with respect to the coolant channel and opposite the outlet face portion of the bar; and a common lateral side wall of said bar and coolant channel lying between said gas channel and the outlet face portion and having a plurality of spaced gas outlets extending from said gas channel portion to said outlet face portion; the cross-section of said bar being substantially constant from one end to the other of said bar; and said gas outlets being disposed closely adjacent said coolant channel throughout the length of said outlets.

6. A blowpipe comprising, in combination, a stem, a head connected to an outlet end of said stem, a pair of divergent pipes connected to said head and having outlet ends, a tip including an orifice bar of polygonal cross-section having a longitudinal gas channel of rectangular cross-section, a longitudinal coolant channel of rectangular cross-section disposed beneath the longitudinal gas channel and slightly offset laterally with respect thereto, a plurality of efferent gas passages extending directly downwardly close to the coolant channel and in the portion of the bar provided by the offsetting of the coolant channel with respect to the gas channel, said channels thereby being in substantially tandem relationship and the overall width of the bar thereby being less than twice the width of either one of the channels, and means for connecting the outlet ends of said pipes to the opposite ends of said gas channel to conduct gas thereto.

7. A blowpipe tip comprising an elongated bar of polygonal cross-section having two open channels therein arranged with their webs angled with respect to each other and with their openings in different faces of the bar, one of said channels serving as a gas distribution passage and the other of said channels serving as a coolant passage, said bar also having a gas outlet face running coextensively with and adjacent to one side of the coolant channel, said coolant channel being slightly offset laterally with respect to the gas distribution channel, a gas outlet passage extending from the bottom of the gas channel to the outlet face and adjacent the bottom of the coolant channel, and cover plates closing the openings and the ends of said channels.

8. A blowpipe comprising, in combination, a stem; a head connected to the outlet end of said stem; a pair of divergent pipes connected to said head; and a tip including an orifice bar of extruded metal of substantially constant polygonal cross-section from end to end having a longitudinal gas channel of rectangular cross-section, a longitudinal coolant channel of rectangular cross-section, and a plurality of efferent gas passages; said channels being disposed in substantially parallel cross-sectional relation with each other and with the bar; said coolant channel being arranged between the flame face of the bar and said gas channel; said channels being surrounded by relatively thin walls; said efferent gas passages being disposed in a wall of said coolant channel at one side of the bar and with their inlet ends opening into said gas channel; said gas passages being disposed closely adjacent said coolant channel throughout the length of said gas passages; the outlet ends of said pipes being connected to the opposite ends of said gas channel to conduct gas thereto, said coolant channel having an inlet at one end of said bar and an outlet at the other end of said bar.

9. A blowpipe comprising, in combination, a stem; a head connected to the outlet end of said stem; a pair of divergent pipes connected to said head; and a tip including an orifice bar of extruded metal of substantially constant polygonal cross-section from end to end having a longitudinal gas channel of substantially rectangular cross-section, a longitudinal coolant channel of substantially rectangular cross-section, and a plurality of efferent gas passages; said channels being disposed in substantially parallel cross-sectional relation with each other; said coolant channel being arranged between the flame face of the bar and said gas channel; said channels being surrounded by relatively thin walls; said efferent gas passages being disposed in a wall of said coolant channel at one side of the bar, in substantially parallel relation with an inner surface of said coolant channel and with their inlet ends opening into said gas channel and their outlet ends terminating at said flame face; said gas passages being disposed closely adjacent said coolant channel throughout the length of said gas passages; the outlet ends of said pipes being connected to the opposite ends of said gas channel to conduct gas thereto.

10. A blowpipe tip comprising an orifice bar of extruded metal of substantially constant rectangular cross-section from end to end having a longitudinal coolant channel of substantially rectangular cross-section provided with an inlet at one end and an outlet at the other end of said bar, a longitudinal gas channel of substantially rectangular cross-section provided with inlets at opposite ends of said bar, and a plurality of efferent gas passages, said channels being disposed in substantially parallel cross-sectional relation with each other and with said bar, said coolant channel being arranged between the flame face of the bar and said gas channel, said channels being surrounded by relatively thin walls; said efferent gas passages being disposed in a wall between said coolant channel at one side of the bar, in substantially close spaced parallel relation with an inner surface of said coolant channel and with their inlet ends opening to said gas channel and their outlet ends terminating at said flame face; said gas passages being disposed closely adjacent said coolant channel throughout the length of said gas passages.

11. A blowpipe tip as claimed in claim 10, in which said orifice bar is curved.

12. A blowpipe tip as claimed in claim 10, in which said orifice bar is straight.

13. A blowpipe tip comprising an elongated body of substantially constant cross-section from end to end having a gas passage and a cooling medium passage therein, said passages lying side by side and extending in the direction of elongation of said body; said body comprising relatively thin walls; one wall having gas outlet passages, each leading from said gas passage and passing throughout its length closely adjacent an inner surface of said cooling medium passage, said outlet passages terminating at points spaced from said gas passage but closely adjacent said cooling medium passage.

14. A blowpipe tip comprising an elongated body of substantially constant cross-section from end to end having a heating gas passage and a cooling medium passage therein, said passages lying side by side and extending in the direction of elongation of said body; said body comprising relatively thin walls; one wall having a plurality of gas outlet passages, each leading transversely from said heating gas passage and passing throughout its length closely adjacent an inner surface of said cooling medium passage, said gas outlet terminating at points spaced from said heating gas passage but closely adjacent said cooling medium passage, the cooling medium passage lying between said heating gas passage and a surface of the tip directly exposed to heat from the flames formed by the heating gas discharged from said gas outlet passages.

15. A blowpipe tip comprising substantially parallel, longitudinally extending, juxtaposed gas and coolant channels, said coolant channel being of substantially rectangular cross-section and located between said gas channel and the flame face of said tip; said coolant channel being surrounded by relatively thin walls; and gas outlet passages extending between said gas channel and said flame face, said gas outlet passages being disposed laterally of said coolant channel in a side wall of the tip; said tip being of substantially constant cross-section from one end to the other of said tip, and said gas outlet passages being disposed closely adjacent said coolant channel throughout the length of said passages.

16. A blowpipe tip as claimed in claim 15, in which said passages comprise two coaxial portions of different diameter, the larger portion opening into the gas channel and the smaller portion opening into the face of said tip.

17. A blowpipe tip comprising an orifice bar of extruded metal having a longitudinal coolant channel provided with an inlet at one end and an outlet at the other end of said bar, a longitudinal gas channel provided with inlets at opposite ends of said bar and a plurality of efferent gas passages, said channels being disposed in substantially close relation with each other, said coolant channel being arranged between the flame face of the bar and said gas channel, and said efferent gas passages being disposed in a wall of said coolant channel at one side of the bar with their inlet ends opening to said gas channel and their outlet ends terminating in said flame face; said gas passages being disposed closely adjacent said coolant channel throughout the length of said gas passages.

EGON B. SCHERL.